(12) United States Patent
Reniska

(10) Patent No.: US 7,020,557 B2
(45) Date of Patent: Mar. 28, 2006

(54) METHOD AND APPARATUS FOR CORRECTING THE DEPTH INDEX FOR WELL-LOG DATA USING PRESSURE MEASUREMENTS

(75) Inventor: Kim Reniska, Austin, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 106 days.

(21) Appl. No.: 10/750,403

(22) Filed: Dec. 31, 2003

(65) Prior Publication Data

US 2005/0149265 A1 Jul. 7, 2005

(51) Int. Cl.
*G01V 9/00* (2006.01)

(52) U.S. Cl. .......................................... 702/6

(58) Field of Classification Search .................... 702/6, 702/9, 12, 13; 324/303
See application file for complete search history.

(56) References Cited

U.S. PATENT DOCUMENTS

| | | | | |
|---|---|---|---|---|
| 4,346,593 A | * | 8/1982 | Howells et al. | 73/152.02 |
| 5,019,978 A | | 5/1991 | Howard, Jr. et al. | |
| 5,581,024 A | * | 12/1996 | Meyer et al. | 73/152.03 |
| 6,145,378 A | * | 11/2000 | McRobbie et al. | 73/490 |
| 6,206,108 B1 | * | 3/2001 | MacDonald et al. | 175/24 |
| 6,427,125 B1 | * | 7/2002 | Gzara et al. | 702/9 |
| 6,833,706 B1 | * | 12/2004 | Niina | 324/346 |
| 2002/0077753 A1 | | 6/2002 | Kelly | |

* cited by examiner

*Primary Examiner*—Donald McElheny, Jr.
(74) *Attorney, Agent, or Firm*—Osha Liang LLP

(57) ABSTRACT

A wireline well-logging data acquisition system and method for establishing corrected depth based on pressure readings from two pressure sensors separated by a known distance.

15 Claims, 11 Drawing Sheets

US 7,020,557 B2

METHOD AND APPARATUS FOR CORRECTING THE DEPTH INDEX FOR WELL-LOG DATA USING PRESSURE MEASUREMENTS

TECHNICAL FIELD

This invention relates in general to the field of acquiring data from a well-logging tool in a data acquisition system connected to a well-logging tool by an electrical cable, and in particular, to a method and apparatus for correcting the depth index of such data.

BACKGROUND OF THE INVENTION

Accurate collection of geophysical property data is a key to successful exploration and production of petroleum resources. Based on data such as electrical and nuclear properties collected in a well-bore, as well as the propagation of sound through a formation, geophysicists make an analysis useful in making many important operational decisions. The analysis includes determination of whether a well is likely to produce hydrocarbons, whether to drill additional wells in the vicinity of an existing well, and whether to abandon a well as being unproductive. Geophysicists may also use well-bore data to select where to set casing in a well and to decide on how to perforate a well to stimulate hydrocarbon flow. One method of collecting well-bore geophysical properties is by way of wireline well-logging. In wireline well-logging, a well-logging tool (also often referred to as a sonde) is lowered into a well-bore on an electrical cable, the wireline. The well-logging tool is an electrically powered measurement device that may, for example, collect electrical data, sonic waveforms that are propagated through the surrounding formation, or radioactivity counts. These measurements are usually converted to a digital form and transmitted on the wireline.

Other methods of collecting well-logging data are known as logging while drilling (LWD) and measuring while drilling (MWD). In these types of well-logging data is collected during the drilling operation.

Well-logging data is normally indexed by the depth at which the measurement was taken. However, with modern equipment the logging measurements may be taken on a time interval rather than on a depth interval and indexed against a time stamp. Such time domain logs are ultimately translated to depth index.

The accuracy of the data is a crucial element in the value of the analysis the well-log data and the correctness of decisions made based on that data. Data accuracy depends both on the accuracy of the measurements made and on the accuracy of the depth index.

In wireline logging the depth index is usually determined by measuring how much cable has been lowered into the borehole and measuring how much cable has been reeled back in. These measurements are done at the surface as the cable passes through the Integrated Depth Wheel (IDW).

IDW measurements are prone to inaccuracies with respect to the actual depth of the measurement tools. For example, the tools may become stuck in the borehole due to various borehole conditions. If the well is being logged in an uphole direction, which is most common, if the tool becomes stuck the cable may stretch as the winch continues to reel in the cable. While a wireline cable may seem very solid, if it is reeled out to several thousand feet, it becomes relatively elastic. Thus, the IDW may measure several turns while the measurement tool is in fact stuck. Conversely, when the tool works itself loose, perhaps from the tension applied through the cable, from its stuck position, the tool may overshoot its natural resting position. If the tool does overshoot the recorded IDW position, the IDW is again inaccurate.

Similar problems also occur in LWD and MWD logging, for example, coil tubing and drill pipe may become bent.

Several different approaches have been suggested for adjusting the recorded depth index. One approach described in Howard, Jr. et al. (U.S. Pat. No. 5,019,978) uses accelerometers to determine the location of the measurement tools. The accelerometer data is applied in an algorithm to correct the depth index. In another approach described in *Method and Apparatus for Correcting the Depth Index for Well-Log Data*, U.S. patent application Ser. No. 09/975,234, filed Oct. 11, 2001, to Ronald C. Kelly and co-assigned hereto, uses tension meter data in combination with the accelerometer data in a proportional-integral-derivative control loop algorithm to correct the depth index. While both the Howard, Jr. et al. and Kelly approaches may be useful in many circumstances there are drawbacks to each. For example, the Howard, Jr. et al. method requires accelerometer data. Not all tools have accelerometers. Also, in certain operations the tool motion may be so small that accelerometer data is not applicable. Kelly's approach requires tension measurements which also may not always be available.

Therefore, there is still a need for improved and alternative approaches to correcting the depth index during well-logging operations.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
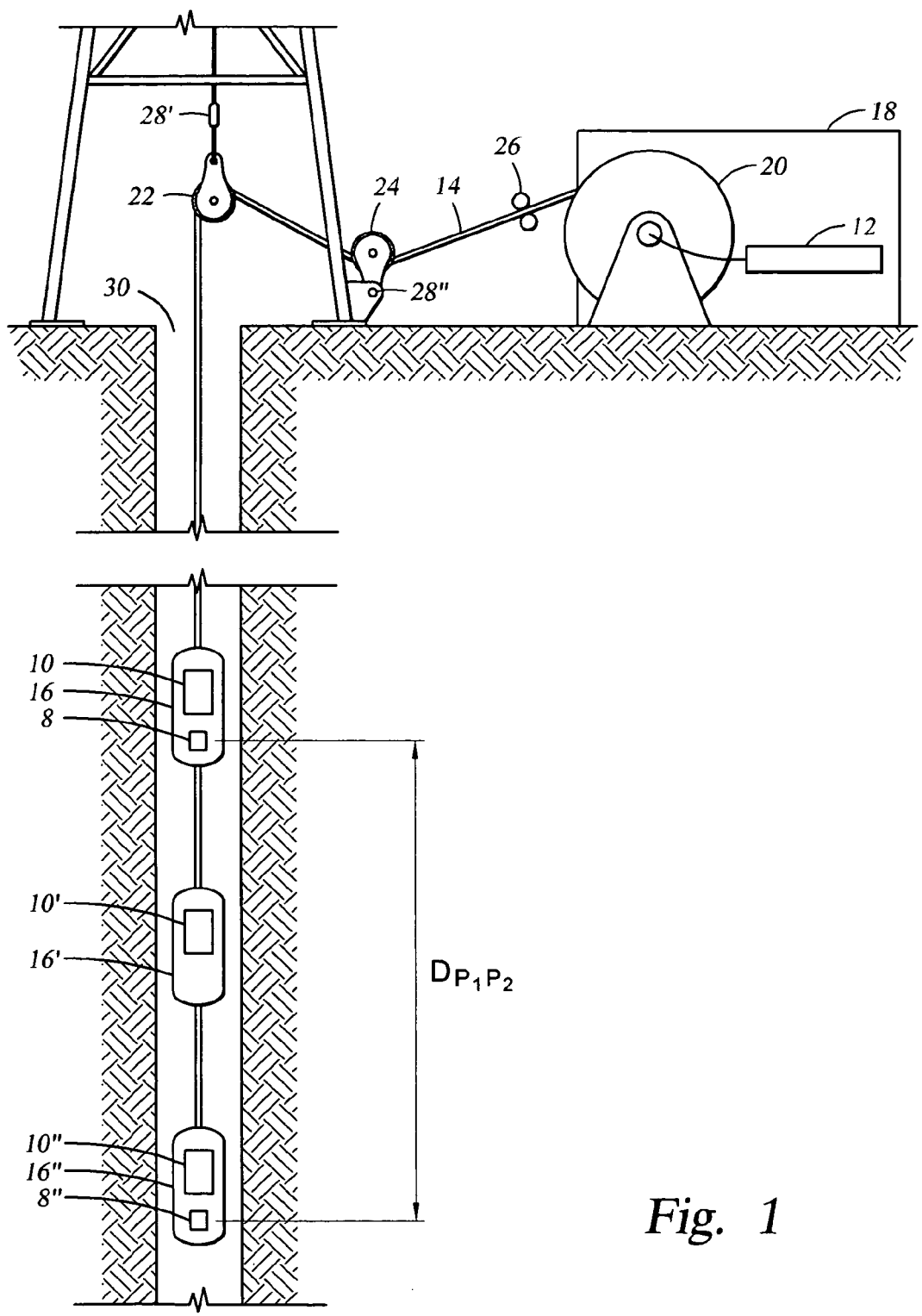
FIG. 1 is a schematic diagram illustrating a well-logging operation including application of the present invention.

In the following detailed description and in the several figures of the drawings, like elements are identified with like reference numerals.

Overview of Wireline Data Acquisition System According to the Invention

As shown in the drawings for purposes of illustration, the invention is embodied in a novel well-logging data acquisition system for correcting the depth index of data collected during a wireline well-logging operation.

In the drawings, a preferred embodiment wireline logging application is illustrated. As shown in FIG. 1, downhole electronic instruments 10 are contained in a well-logging tool 16. In a well-logging operation often several tools 16 (e.g., 16' and 16") are connected to form a tool string.

The well-logging tool 16 may also contain one or more pressure sensors 8. The pressure sensor operates to measure borehole pressure (Pressure). The well-logging tools 16 are connected to a wireline cable 14. The tools 16, including the electronic instruments 10, are lowered into a well-bore on the wireline cable 14. In LWD applications the collected data is transmitted to the surface using mud pulses.

The wireline cable 14 is connected at the surface to a winch at a logging unit 18. The logging unit may be a well-logging truck or an offshore-logging unit. The wireline cable 14 passes through sheave wheels 22 and 24. The wireline cable 14 further passes through a depth-measuring device 26. The depth-measuring device 26 may be, for example, a pair of rollers that measure how much cable has been let out by measuring the rotation of the rollers (this device is known as Integrated Depth Wheels (IDW) taking a measurement known as IDW depth).

The wireline cable 14 is further connected to a data acquisition computer 12. The data acquisition computer 12 may be a digital computer having components such as a memory, a central processing unit, one or more secondary storage devices, e.g., a disk drive and a monitor. The data acquisition computer 12 typically contains a modem for receiving and transmitting data from and onto the wireline cable 14.

Additional tools 16' and 16" may be connected to the wireline tool 16 to form a tool string. If one of those tools also has a pressure sensor 8" (in addition to the pressure sensor 8 in wireline tool 16) it is possible to take two pressure readings, P1 Pressure at pressure sensor 8 and P2 Pressure at pressure sensor 8", that are separated from one another by a known distance (Pressure Sensor Distance). Of course, it does not matter which two tools the two pressure sensors 8 and 8" are located in. In fact, the two sensors may be located in the same tool.

We describe herein several methods for determining a corrected depth index based on taking pressure readings at two pressure sensors that are separated from one another by a known distance. For exemplary purposes we refer to the uphole pressure sensor measurement as P1 and the downhole pressure sensor measurement as P2.

Figure 2:
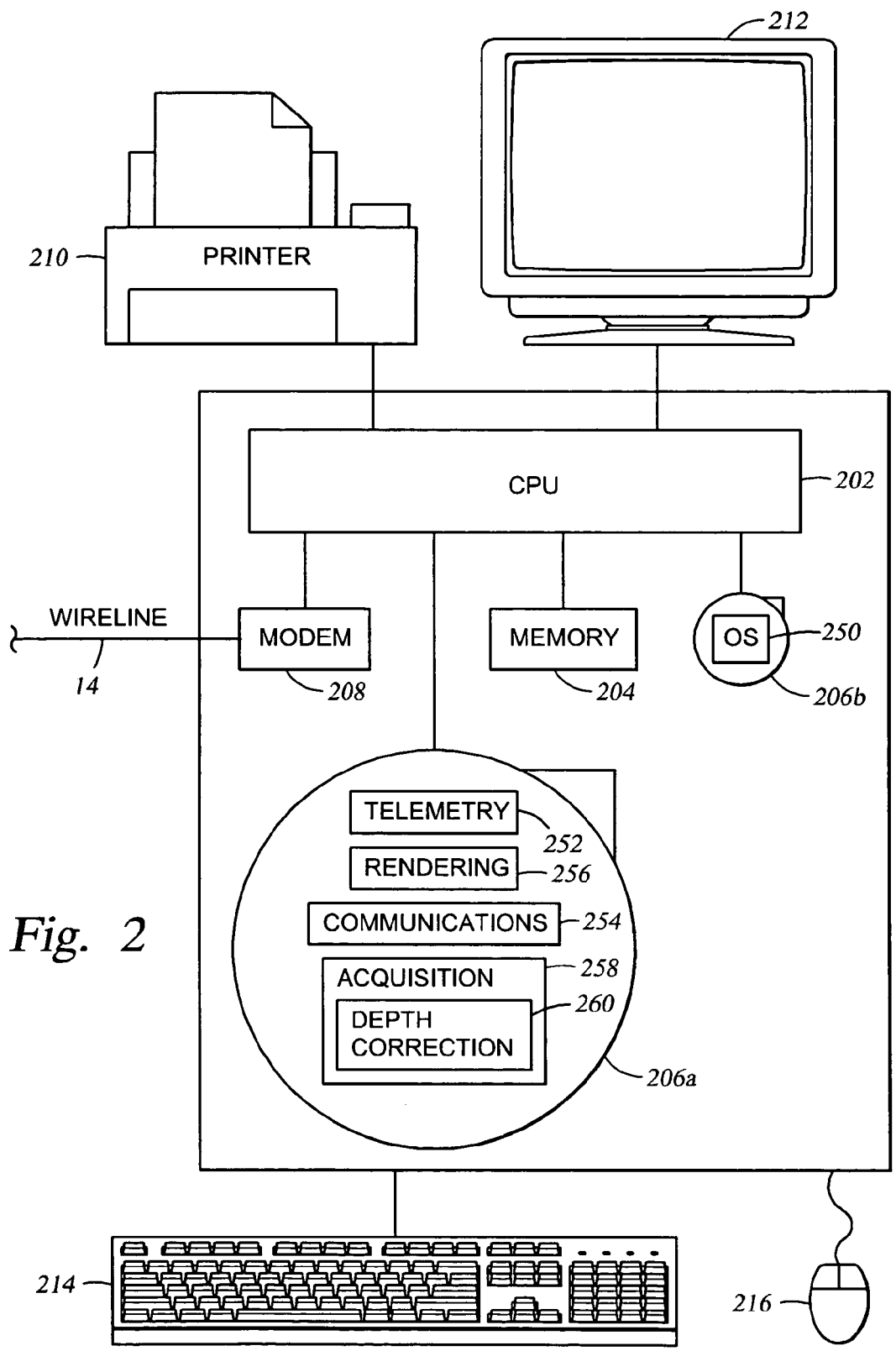
FIG. 2 is a schematic diagram of a wireline well-logging data acquisition computer system.

FIG. 2 is an exemplary illustration of the architecture of the acquisition computer 12. The surface acquisition computer 12 contains one or more central processing units (CPU) 202 (In the illustration, only one CPU is shown. However, in some implementations multiple CPUs may be used.). The CPU 12 is connected to one or more memory modules 204 (one shown). The memory modules may include, for example, random access memory (RAM), read-only memory (ROM), and erasable-programmable read-only memory (EPROM). The CPU is also connected to one or more secondary storage devices 206, e.g., 206a and 206b. The CPU is further connected to a modem 208. The modem 208 is connected to the wireline cable 14 and is operable to transmit and receive data on the wireline cable 14.

The CPU 202 may also be connected to input/output devices such as a printer 210, a monitor 212, a keyboard 214, or a mouse 216. The various devices 204 through 216 may be connected to the CPU over a bus (not shown).

The secondary storage devices store various computer programs for controlling the acquisition of data via the wireline 14. These computer programs may include an operating system (OS) 250, telemetry software 252, communications software 254, data rendering and visualization software 256, and data acquisition software 258. An acquisition software system may also include depth index correction software 260 (discussed in greater detail below).

Overview of Wireline Logging Operation

Wireline logging refers to the process of lowering one or more logging tools 16 into a wellbore on a wireline cable 14. Measurements of geophysical properties are made by the logging tools 16 and transmitted over the wireline cable 14 to a computer system 12 at the surface.

The measurements include properties such as electrical properties, e.g., resistivity and spontaneous potential, and radioactivity. Typically, the measurements are made at fixed depth intervals as the logging tool is being pulled up through the well-bore. Each data item measured by one of the tools is mapped to a depth index collected by the depth-measuring device 26.

In the highly idealized illustration of FIG. 1, the wellbore is illustrated in an idealized fashion as perfectly vertical with perfectly smooth walls. In reality neither is ever the case. In most cases the well-bore either intentionally or unintentionally deviates from the vertical axis. Furthermore, well-bores often have very rough walls and may sometimes have caved in to cause obstructions in the well. The bends, the borehole rugosity, the obstructions, and impediments to smooth travel in the well-bore, can cause the logging tool to stick or otherwise suffer erratic motion.

Because the wireline cable has some elasticity, when extended considerable distances into the earth's crust, the cable stretches. The stretch due to the weight of the tool string and the weight of the cable is predictable. However, when a logging tool (or tool string) sticks in the well, the continued pull on the wireline 14 from the winch 20 may cause the cable to stretch allowing the winch 16 to continue to rotate and reel in the wireline 14 at the surface. Because the tool 16 is not moving in the borehole when stuck or moving at a rate different from the rate the wireline 14 is being reeled in at the winch 20, the depth index measured at the winch 20 does not accurately reflect the actual depth of the measurements by the tool 16. As the winch 20 continues to reel in the wireline cable 14, the tension in the wireline 14 builds up until it is greater than the force needed to release the tool from being stuck.

At the point when the tool 16 has released from being stuck, the tension in the wireline 14 causes the tool 16 to rapidly accelerate and "yo-yo" in the borehole. The depth correction software 260 aims to produce a corrected depth index that represents a correction for the erratic tool motion due to borehole rugosity, tool sticking and any other condition that may cause IDW or any other index measurement to be an inaccurate measure of actual distance along the borehole.

Depth Index Correction

Figure 3:
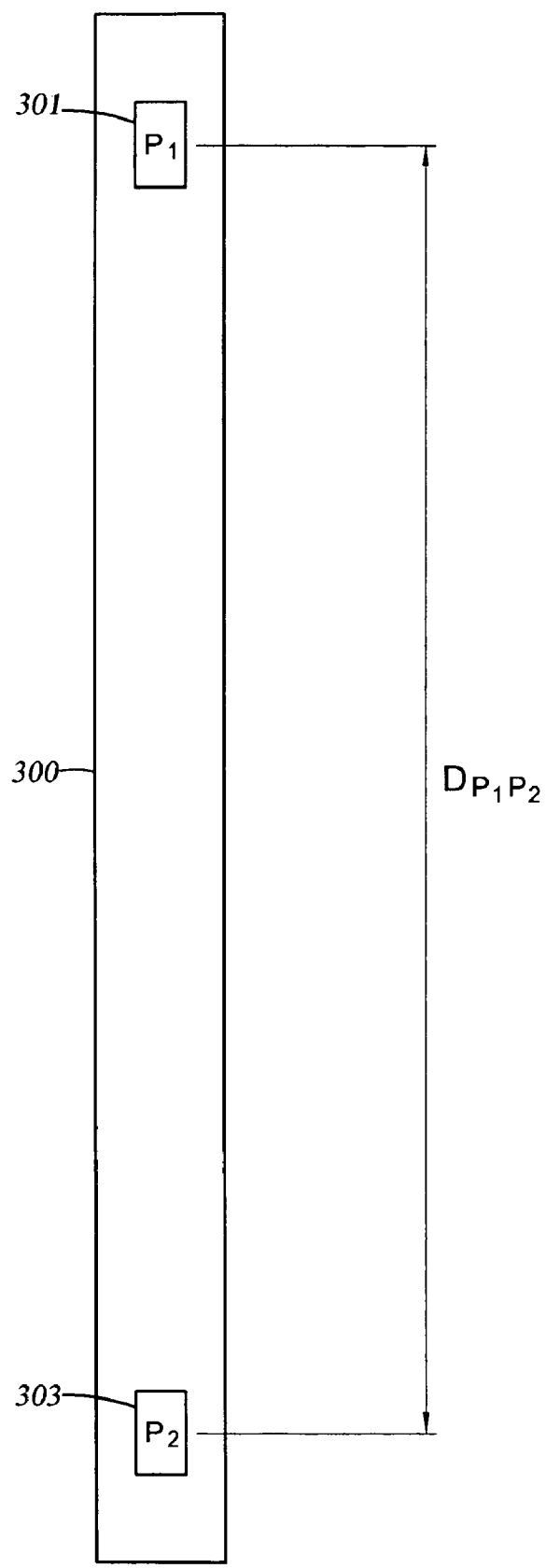
FIG. 3 is a diagram of a well-logging tool having two pressure sensors separated by a known distance.

FIG. 3 is a schematic of a logging tool 300 having two pressure sensors. As illustrated in FIG. 1, in an alternative, the two pressure sensors may be in separate tools. A first pressure sensor 301, P1, and a second pressure sensor 303, P2, are separated by a known distance $D_{P1P2}$.

Figure 4:
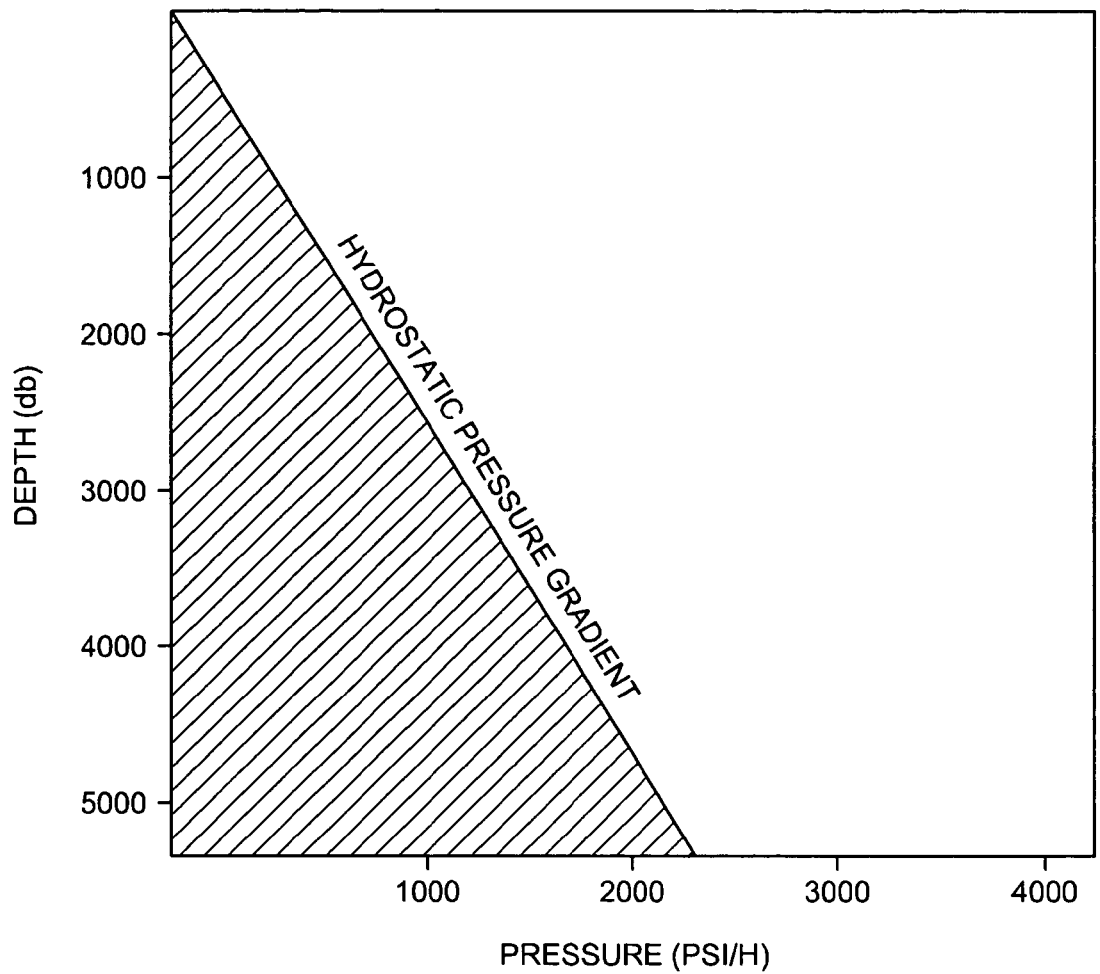
FIG. 4 is a graph of typical pressure to depth due to the hydrostatic pressure gradient of fresh water.

Pressure in a borehole, due to formation pressure, tends to increase with depth according to the hydrostatic pressure gradient of freshwater, 0.433 psi/ft. This relationship is illustrated in FIG. 4. As the tool 300 moves down the borehole when the pressure at pressure sensor 301 equals the pressure recorded earlier at pressure sensor 303 it can be surmised that the tool 300 has moved exactly a distance equal to $D_{P1P2}$. Conversely, as the tool 300 moves up the borehole when the pressure at pressure sensor 303 equals the pressure recorded earlier at pressure sensor 301 it can be surmised that the tool 300 has moved exactly a distance equal to $D_{P1P2}$. Or when $P_i=P_j$ it can be said that $Depth_i=Depth_j-D_{P1P2}$ or $Depth_i=Depth_j+D_{P1P2}$ depending on whether the tool moves up-hole ("−") or down-hole ("+") where i and j are indices in an array of recorded measurements. The indices i and j may be depth indices, such as IDW, or time indices. Table I, below, is an exemplary table of values indexed by a timestamp.

TABLE I

Buffer of indexed pressure and measurement data with depth values.

| Timestamp | IDW | CD | P1 | P2 | Tool Measurements |
|---|---|---|---|---|---|
| 10.00 | 1000 | 1000 | 450 | 454 | SP = 30, GR = 100 |
| 10.01 | 999.5 | 1000 | 450 | 454 | SP = 30, GR = 100 |
| 10.02 | 999 | 999.5 | 449.75 | 453.75 | SP = 29, GR = 101 |

Thus, for each timestamp, there is a recorded depth, IDW, a P1 and a P2 value and some tool measurements. A corrected depth index, CD, is computed by the depth correction logic 260.

Figure 5:
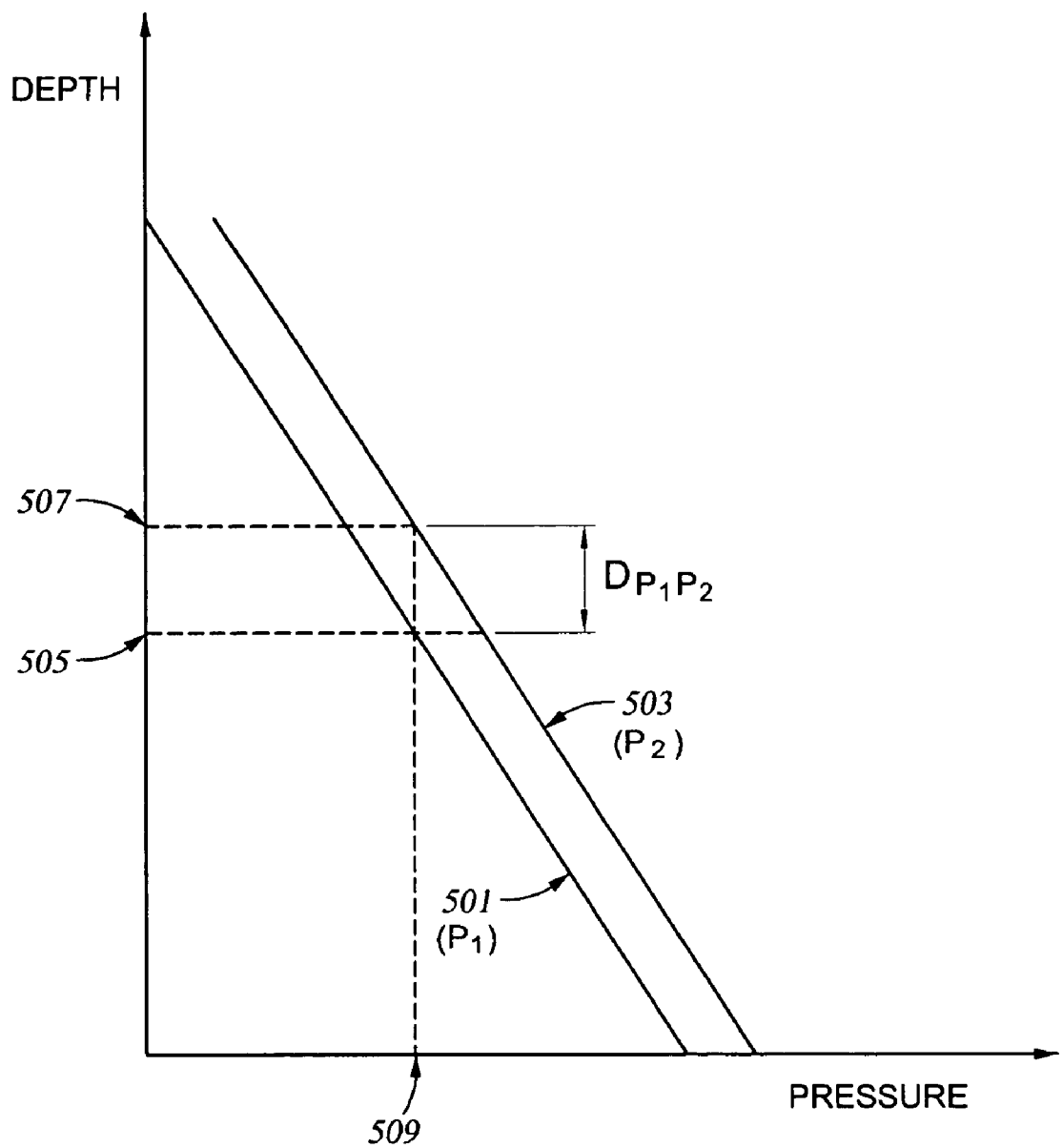
FIG. 5 is a graph of pressure to depth curves of two pressure sensors separated by a known distance and moving through an ideal vertical borehole.

FIG. 5 is a graph illustrating the relationship of P1 and P2 in an ideal borehole. The pressure curve for pressure sensor 301 (P1) is illustrated as line 501 and similarly the pressure curve for pressure sensor 303 (P2) is illustrated as line 503. In a borehole that is not perfectly vertical, the plots corresponding to lines 501 and 503 may have a varying slope as the pressure in such a borehole would not be expected to be linear with distance along the borehole to the surface. A vertical borehole has 0 degrees deviation. As the deviation increases, the pressure difference between the 2 sensors (dP=P2−P1) decreases. At 60 degrees deviation, dP would be half that of a vertical borehole. The algorithm is not affected by changes in borehole deviation or variations in density of the mud.

Consider a tool 300 moving up-hole. Because pressure sensor 301 (P1) is a given distance, $D_{P1P2}$, above pressure sensor 303 (P2) the pressure registered by pressure sensor 301 (P1) at any given depth, e.g., a depth 505, will be lower than the corresponding pressure registered by pressure sensor 303 (P2). Conversely, the tool 300 will be a certain distance, $D_{P1P2}$, higher up in the borehole when pressure sensor 303 (P2) registers the same pressure (e.g., pressure 509) as pressure sensor 301 (P1) registered at a particular depth (in this case, depth 505).

Figure 6:
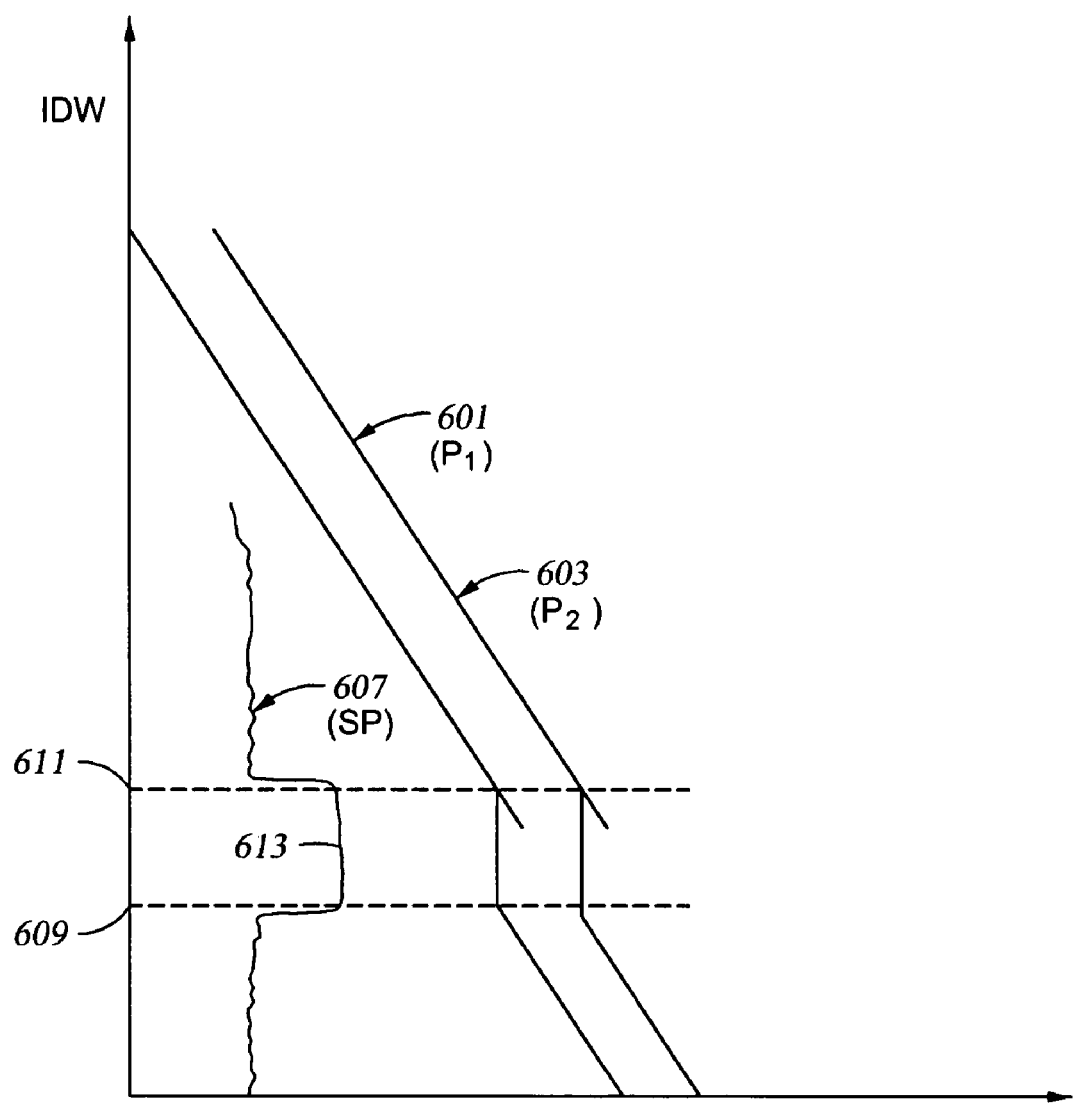
FIG. 6 is a graph of pressure readings collected from two pressure sensors separated by a known distance and a well-logging measurement plotted against an Integrated Depth Wheel (IDW) depth.
Figure 7:
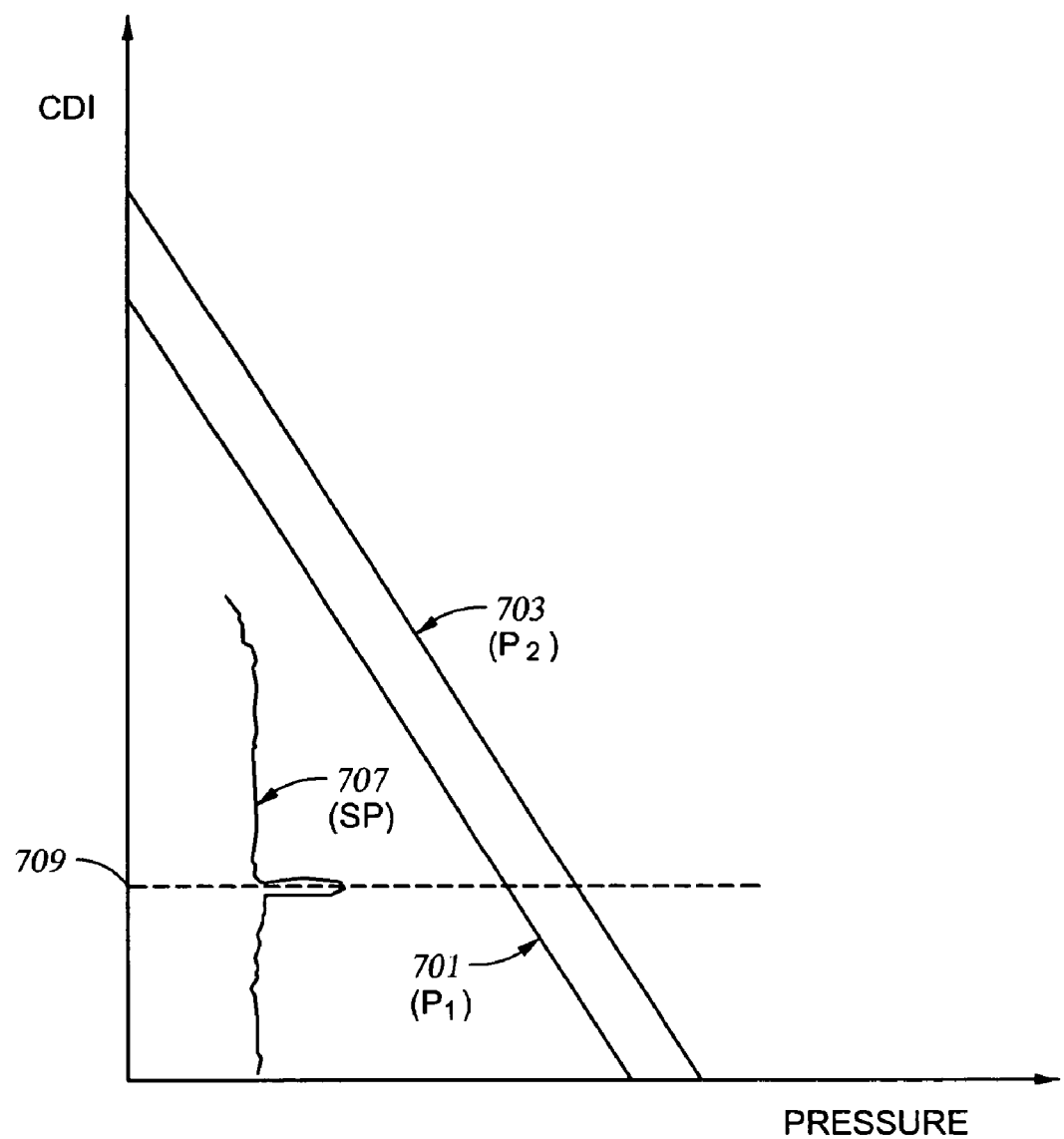
FIG. 7 is a graph of pressure readings collected from two pressure sensors separated by a known distance and a well-logging measurement plotted against a corrected depth (CD) determined according to the invention.
Figure 8:
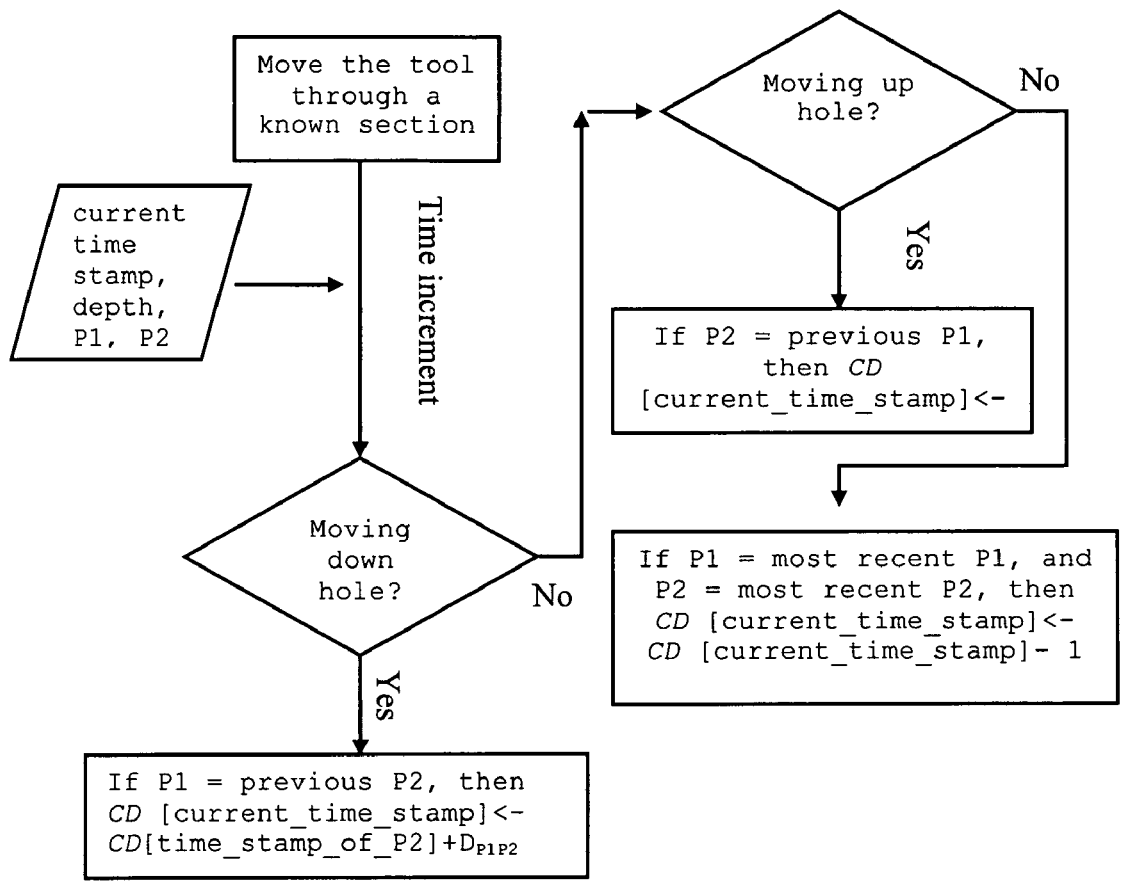
FIG. 8 shows a flowchart of a method for filling database (Algorithm I) in accordance with one embodiment of the invention.
Figure 9:
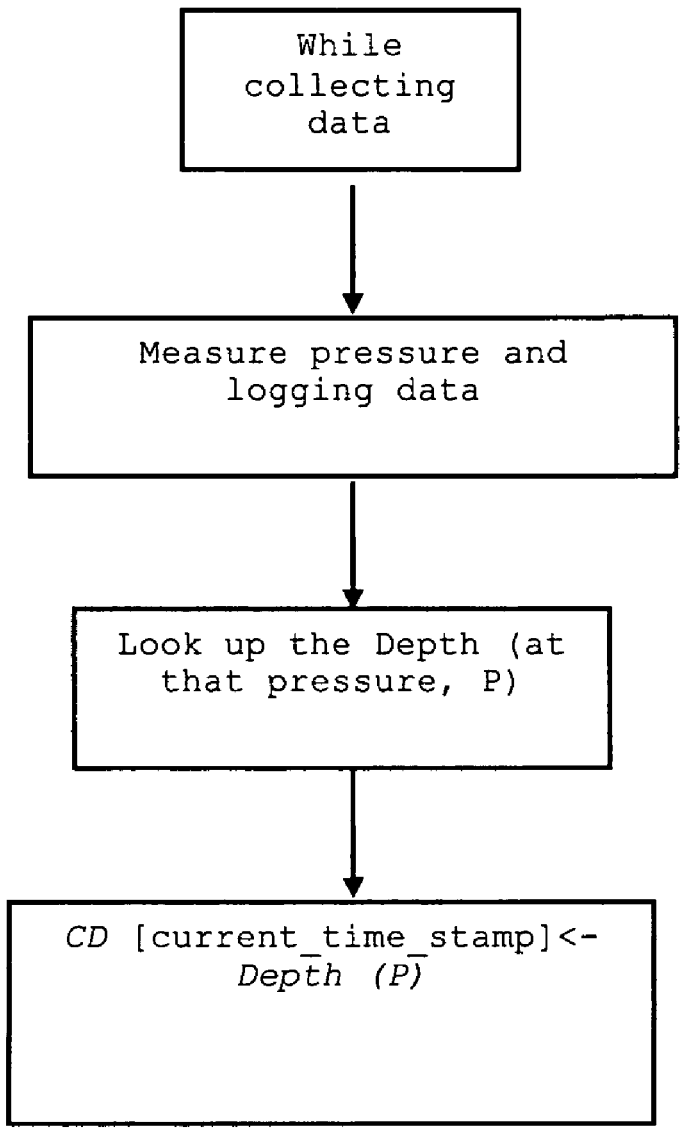
FIG. 9 shows a flowchart of a method for database lookup of corrected depth (Algorithm II) in accordance with one embodiment of the invention.
Figure 10:
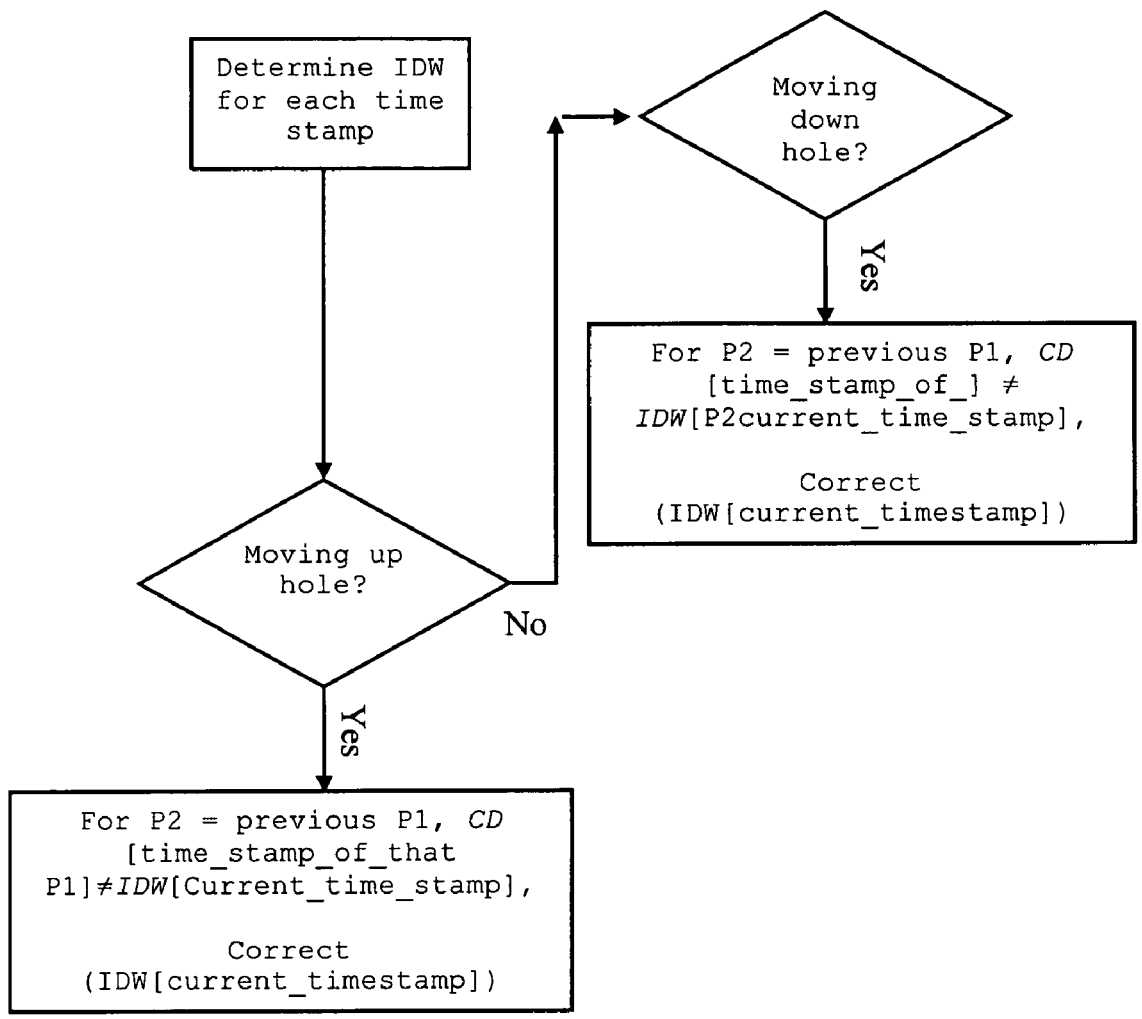
FIG. 10 shows a flowchart of a method for correcting IDW (Algorithm III) in accordance with one embodiment of the invention.
Figure 11:
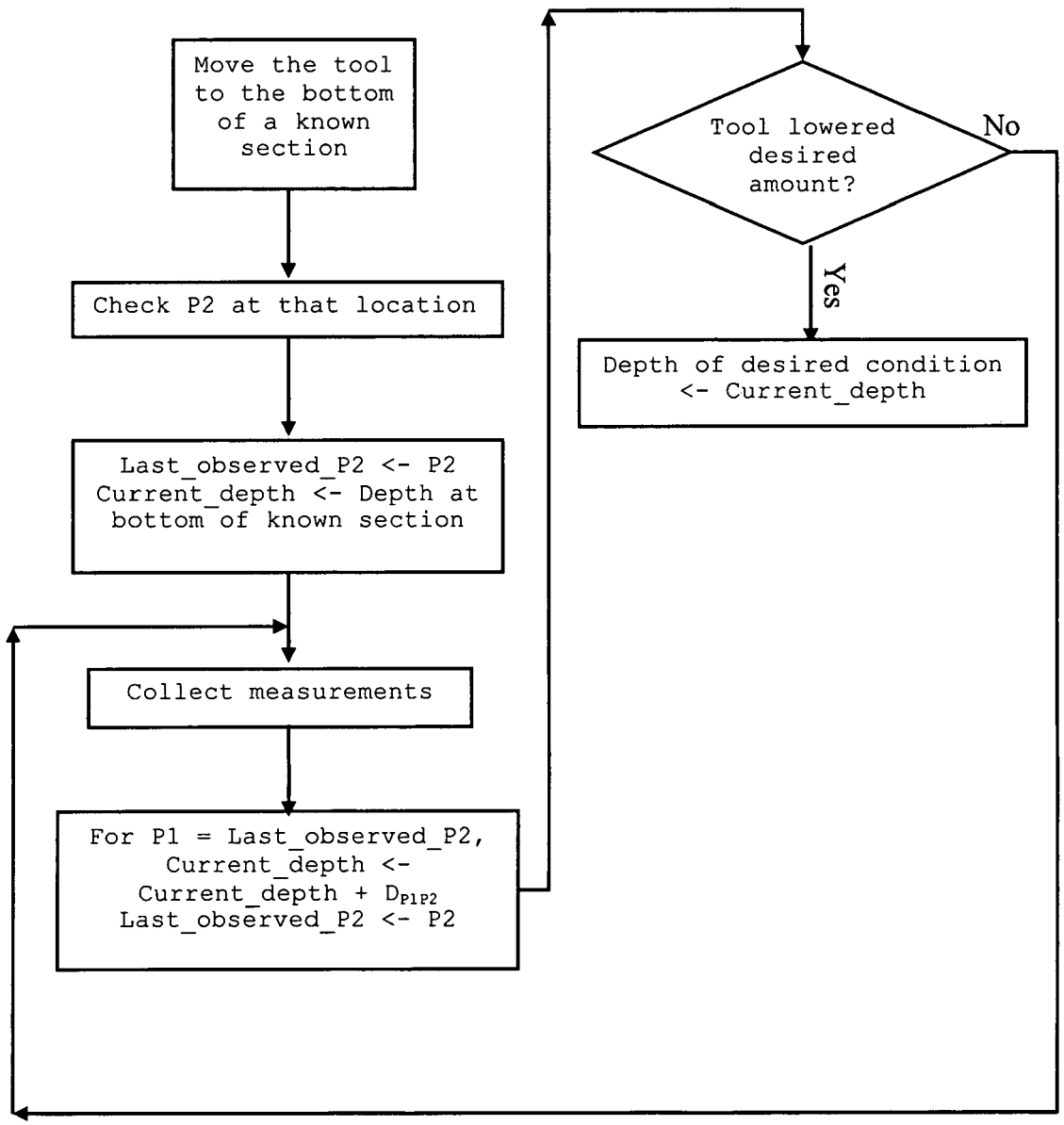
FIG. 11 shows a flowchart of the inch worm method (Algorithm IV) in accordance with one embodiment of the invention.

FIG. 6 is a graphical illustration of the pressure curves and a measurement curve (e.g., spontaneous potential, SP) plotted against IDW and illustrates the pressure curves when the tool 300 sticks at a particular depth. In FIG. 6, plots 601 and 603 correspond to pressure measurements taken by pressure sensors 301 and 303, respectively. The tool 300 also collects a measurement, e.g., SP, curve 607. Moving up-hole, the tool 300 sticks at depth 609. However, because of the elasticity of the cable it is possible for the wheel to reel in additional cable and consequently the IDW measurement continues to decrease through point 611 on the IDW axis. Yet, because the tool 300 is stuck in the borehole both P1 (601) and P2 (603) remain constant. SP also remains constant (section 613) with respect to IDW between IDW depths 609 and 611 because the tool 300 is stuck and collecting the same measurement over-and-over again until the tool 300 becomes free. FIG. 7 is a graphical illustration of the pressure curves and the measurement curve indexed against a corrected depth index (CD) corresponding to the illustration of FIG. 6. The corrected depth index reflects that the tool stuck at depth 609 (here, depth 709). Presumably, CD and IDW were identical to depth 609 (IDW) and depth 709 (CD). At depth 709, the CD algorithm observed that P1 and P2 had turned constant. Therefore, the algorithm adjusts the CD depth accordingly. At some point later in time, reflected by depth 611 in FIG. 6, the CD algorithm observes that the pressures again start changing, indicating a movement of the tool 300. At that point, the CD algorithm assigns a CD value corresponding to the CD value at the point when P1 was the same value as P2 is at the point when the pressures again starts to change. In the resulting plot of SP the section 613 of constant SP values have been removed and the SP curve is correctly indexed against actual depth along the borehole.

Corrected Depth Index Algorithm

FIGS. 5, 6, and 7 are graphical illustrations of the operation of the Corrected Depth Index algorithm used by the depth correction logic 260 according to the present invention. The following section describes the algorithms in terms of pseudo-code.

Three different basic algorithms are described below. In the first algorithm a database is filled with corrected depth index values for each sample taken. "Database" is used herein as a broad concept encompassing all storage mechanisms in which there is an association between an index and particular values for one or more quantities, e.g., tables stored in disk files or in memory. In the second algorithm, while moving through a borehole, the database of values is used to obtain a corrected depth corresponding to a particular pressure. In the third algorithm, pressure values are used to determine when and how to correct the IDW values. There are many possible alternatives to these algorithms all of which must be considered equivalents thereto.

Algorithm I: Fill database:

```
1   Move the tool through a known section and
2   For each time increment (current_time_stamp)
        fill depth index buffer (Table I) with
        (current time stamp, depth, P1, P2);
3   When buffer has sufficient amount of data
4       For each time increment (current_time_stamp)
5           If moving down hole then
6               If P1 = a previously recorded P2 value then
7                   Corrected_depth [ current_time_stamp] ←
                        Corrected_depth [time_stamp_of_that_P2] + D_{P1P2}
```

-continued

| 8  | Else If moving uphole then |
|----|---|
| 9  | If P2 = a previously recorded P1 value then |
| 10 | Corrected_depth [ current_time_stamp] ← Corrected_depth [time_stamp_of_that_P2] − $D_{P1P2}$ |
| 11 | Else If P1 = Most_ recent_P1 and P2 = Most_recent_P2 then |
| 12 | Corrected_depth [current_time_stamp] ← Corrected_depth [current_time_stamp − 1] |

Table I, above, illustrates a table used by CD algorithm. The table is indexed by whatever measurement the various measurements are indexed against. It is possible to index against ID W, however, in a preferred embodiment measurements are taken as a function of time. These time-indexed measurements may be taken as frequently as several per second. At the onset of the algorithm, because P1 and P2 values that are taken at a distance apart, namely $D_{P1P2}$, pressure versus depth measurements corresponding to this distance must first be obtained. In Step 1, the tool 300 is moved through a known section. For example, the first several hundred feet the IDW can be trusted to be an accurate depth measurement.

For each time stamp, i.e., in Step 2, for each time a measurement is taken, the table is filled in with the quadruplet (current timestamp, IDW, P1, P2). In the sequence where the table is being initialized the IDW is used as a stand-in for the corrected depth index.

When there is sufficient amount of data in the buffer (Step 3), the algorithm begins correcting the depth index, i.e., determining a Corrected_depth, CD, value, Steps 4 et seq.

For each time increment (note: the algorithm will work with any index. Thus, this could be "for each recorded IDWvalue"), if the tool is moving down-hole then the pressure observed by pressure sensor 301, P1, is compared to previously recorded P2 values in the buffer to find a P2 value that corresponds to the observedP1 value, Step 6. The Corrected_depth of the current index, e.g., timestamp, is set to the Corrected_depth+$D_{P1P2}$ of the entry with that P2 value, Step 7.

If the tool is moving up-hole then the pressure observed at P2 is compared against previously recordedP1 values, Step 9, and the Corrected_depth, CD, value of the current index is set to the Corrected_depth−$D_{P1P2}$ of the entry with thatP1 value, Step 10.

If, however, the pressure is not changing as determined by the currentP1 and P2 values being the same as the most recent P1 and P2 values, Step 11. That condition is indicative of the tool not moving. Therefore, the Corrected_depth of the current time stamp is set to the Corrected_depth of the previous time stamp.

The Algorithm I could, for example, be run on the down-hole portion of a logging job thereby producing a database to look up pressure versus depth values for subsequent passes.

In a logging job, the logging tools are often run repeatedly up and down through the borehole. Therefore, it is likely that a complete job has multiple entries in the buffer of Table 1 with the same P1 and P2 values. There are many ways to deal with that. For example, an operator may select the CD values from a particular pass as being the "correct" CD values, the CD values of a particular pressure may be averaged to produce a correlation between pressure and depth, or CD values for a particular pass can be used as a depth index for measured data of that particular pass.

Algorithm I may alternatively be expressed as, wherein the tool is moving in the direction of the second pressure sensor 303.

If the pressure sensors are a fixed distance apart, $D_{P1P2}$ and the depth of the first pressure sensor, $d_{P1}$, at a given time, $t_j$, is a known depth, x, $$d_{P1}(t_j)=x,$$

Then the depth of the second pressure sensor, $d_{P2}$, at that time is $$d_{P2}(t_j)=x+D_{P1P2}.$$

At a later time, $t_k$, when the pressure measured by the first senor, $p_1$, equals pressure measured by the second pressure sensor, $p_2$, at the previous time $t_j$ $$\text{when } p_1(t_k) = p_2(t_j),$$

$$\text{then } d_{P1}(t_k) = d_{P2}(t_j)$$

$$= d_{P1}(t_j) + D_{P1P2}$$

Algorithm II, Database Lookup, uses the database produced by Algorithm I to a corrected depth, CD, against observed measurements.

| 1 | While collecting data |
|---|---|
| 2 | Measure pressure and logging data; |
| 3 | Look up the depth Depth(at that pressure, P); |
| 4 | Corrected_depth [current_time_stamp] ← Depth(P) |

Algorithm II: Database Lookup Of Corrected Depth

For each measurement during a logging job, Step 1, the pressure is observed as whatever physical quantities that are being logged, Step 2. Next the pressure is looked up in the buffer, Step 3, and the Corrected_depth, CD, is set to the depth at pressure in the table.

The third algorithm, Correct IDW, operates to correct an observed IDW when pressure-based depth indicates that the observed IDW is incorrect.

| 1 | While collecting data do |
|---|---|
| 2 | Determine IDW for each time stamp; |
| 3 | If moving uphole |
| 4 | If P2 = a previously recorded P1 value then |
| 5 | If Corrected_depth [time_stamp_of_that P1] ≠ IDW [Current_timestamp] then |
| 6 | Correct (IDW[current_timestamp]) |
| 7 | If moving downhole |
| 8 | If P1 = a previously recorded P2 value then |
| 9 | If Corrected_depth [time_stamp_of_that P2] ≠ IDW [Current_timestamp] then |
| 10 | Correct (IDW [current_timestamp]. |

Algorithm III: Correct IDW

In Algorithm III a depth index, e.g., IDW, is obtained for each time interval. A Corrected_depth is determined as above from the pressure readings, i.e., if moving up-hole, Step 3, If P2 is equal to a previously recorded P1 value then Corrected_depth at that P1 value is not equal to the current IDW value, the IDW value is corrected. The IDW value may be corrected by simply replacing it with the Corrected_depth corresponding to the pressure measurements. The previously recorded P1 values can either be those recorded on a previous pass or, preferably, those that were recorded when the P1 values were measured on the current pass. previously recorded P2 value, Step 8, the Corrected_depth at that P2 value is corrected as discussed above.

A fourth algorithm, known as the Inch Worm, can be used to determine a particular location of a logging job, e.g., the bottom of the measured section or the bottom of the borehole.

| | | |
|---|---|---|
| 1 | Move the tool to the bottom of a known section | |
| 2 | Check the P2 at that location | |
| 3 | Last_observed_P2 ← P2 | |
| 4 | Current_depth ← Depth at bottom of known section | |
| 5 | REPEAT | |
| 6 |   Collect measurements | |
| 7 |   If P1 = Last_observed_P2 then | |
| 8 |     Current_depth ← Current_depth + $D_{P1P2}$ | |
| 9 |     Last_observed_P2 ← P2 | |
| 10 | UNTIL the tool has been lowered desired amount | |
| 11 | Depth of desired condition ← Current_depth | |

Algorithm IV: The Inch Worm

Frequently, the first section of a borehole can be relatively well known. For example, a certain amount of casing may have been set. If it is known that x feet of casing has been set, it would be possible from measurements to determine when x feet have been logged. In Algorithm IV the tool is moved to the bottom of this known section (Algorithm IV is described herein with the tool moving down-hole. However, the algorithm can easily be reversed.), Step 1. At that location P2 is observed, Step 2, the observed P2 is recorded in a variable known as last_observed_P2, Step 3, and a variable called current_depth is set to the depth of the bottom of the known section, Step 4.

Next a number of Steps (6, 7, 8, and 9) are repeated until the tool has been lowered to a point for which the depth wants to be known. This location could merely be the bottom of the desired logging run or the bottom of the borehole as observed from some other measurements. In Step 6 measurements are made. These measurements include both a P1 and a P2 measurement. If the P1 measurement is equal to the Last_observed_P2 it can be surmised that the tool has been moved down the hole by $D_{PIP}$ and that quantity is added to the Current_depth, Step 8, and the Last_observed_P2 variable is reset to the current P2.

When the desired depth has been reached, Step 10, the depth of the desired condition, e.g., bottom hole or bottom of logged section, may be set from the Current_depth variable.

Calibration of Pressure Sensors

It is possible that the pressure sensors 301 and 303 do not have the same response to conditions in the borehole. In such an event, the P1 and P2 curves would not have the same slope. For the algorithms above, it is not necessary that P1 and P2 measurements are accurate so long as they can be correlated to one another. To do that, the tools are moved through a known section of the borehole. That is usually the few hundred feet nearest to the surface. The P1 and P2 values may be observed during that section. If their slopes are not parallel, the gain of one or both pressure sensors is adjusted until the slopes match.

The invention has been described with a particular data flow for illustrative purposes. Modifications to that dataflow are also possible and are to be considered within the scope of the invention. The foregoing describes a comparison of pressures and indices in precise terms, such as "equal". Such exact comparisons shall be considered to be satisfied if within ranges set by an operator. It may, for example, be convenient to consider two pressures to be equal if they are within the expected pressure variation of 0.05 psi. The actual value depends on the physical accuracy and resolution of the pressure sensors.

Furthermore, the systems and methods described above are described in terms of taking pressure measurements because pressure tends to be monotonically increasing with depth and is therefore a useful quantity for making comparisons between measurements taken from sensors that are separated by a known distance. However, other physical quantities and sensors for measuring such physical quantities could be substituted for pressure and pressure sensors, for example, using dual SP (spontaneous potential) sensors and making comparison of the SP curves associated therewith. The algorithms described above would have to be modified since SP is not a monotonically increasing curve. Known depth-matching algorithms as those employed during repeat sections can be applied to determine how much to adjust the corrected depth when the sensor responses indicate that the tool was stuck for a certain number of consecutive measurements.

The invention is not limited to any of the specific features described herein, but includes all variations thereof within the scope of the appended claims.

What is claimed is:

1. A well-logging data acquisition system comprising:
   at least one well-logging instrument having at least a first and a second pressure sensors;
   a central processing unit (CPU) connected to the well-logging instrument via a telemetry system cable; and
   a storage system connected to the central processing unit and having:
   a depth correction logic operable to instruct the CPU to compute a corrected depth from pressure readings of the first and second pressure sensors.

2. The well-logging data acquisition system of claim 1 the first and second pressure sensors are located a known distance apart.

3. The well-logging data acquisition system of claim 1 wherein the depth correction logic comprises:
   a logic to compare a second pressure observed by the second pressure sensor to pressures previously recorded by the first pressure sensor and setting a corrected depth index based on a location of the well-logging instrument when the first pressure sensor recorded a pressure substantially equal to the second pressure.

4. The well-logging data acquisition system of claim 1 wherein the depth correction logic comprises:
   a logic to calculate and record corrected depth values having instructions to make an entry for each measurement taken including a first pressure recorded by the first pressure sensor and a second pressure recorded by the second pressure sensor, and a corrected depth value determined by if moving in the direction of the first pressure sensor, setting the corrected depth of a current entry by subtracting the distance between the two pressure sensors from the corrected depth when the first pressure sensor had recorded a pressure value substantially equal to the pressure observed by the second pressure sensor, or
   if moving in the direction of the second pressure sensor, setting the corrected depth of the current entry by adding the distance between the two pressure sensors to the corrected depth when the second pressure sensor had recorded a pressure value substantially equal to the pressure observed by the first pressure sensor for the current entry.

5. The well-logging data acquisition system of claim 4 wherein the depth correction logic further comprises instructions to:
set the corrected depth of a current entry to the corrected depth of the preceding entry if at least one of the pressure sensors indicates no change in pressure from the preceding entry to the current entry.

6. The well-logging data acquisition system of claim 4 wherein the depth correction logic further comprises instructions to:
set the corrected depth of a current entry to the corrected depth of the preceding entry if both of the pressure sensors indicate no change in pressure from the preceding entry to the current entry.

7. The well-logging data acquisition system of claim 4 wherein the depth correction logic further comprises instructions to receive an observed pressure from a pressure sensor, look up the observed pressure to find a depth value associated with the observed pressure, and set a corrected depth for other measurements made at the same time to be the depth value associated with the observed pressure.

8. The well-logging data acquisition system of claim 1 wherein the depth correction logic comprises instructions to set a corrected depth equal to a depth previously recorded depth when the pressure of a first sensor equaled the current pressure observed by a second sensor.

9. The well-logging data acquisition system of claim 1 wherein the depth correction logic further comprises instructions to initialize a table of corrected depth values based on a known section of a borehole.

10. A method for determining a corrected depth value in a well-logging operation comprising:
for each measurement taken collecting a first pressure using a first pressure sensor and a second pressure using a second pressure sensor wherein the first pressure and the second pressure are collected at a known distance from one another;
comparing the first pressure to previously recorded values for the second pressure; and
setting a corrected depth value to be a previously recorded depth value corresponding to an entry in which a previously recorded value for the second pressure is substantially equal to the first pressure adjusted for the distance between the first pressure sensor and the second pressure sensor.

11. A method for determining a depth value in a well-logging operation comprising:
a. determining the pressure of a second pressure sensor at a known depth in a borehole, setting a second pressure variable equal to that pressure, and setting a current depth variable equal to the known depth;
b. moving a well-logging instrument to a location wherein a first pressure sensor observes a pressure substantially equal to the second pressure variable;
c. adding the distance between the first and second pressure sensor to the current depth variable, and setting the second pressure variable equal to the pressure observed by the second pressure sensor after step b; and
d. repeating steps b and c until a desired depth has been reached or a desired condition has been met.

12. A well-logging data acquisition system comprising:
at least one well-logging instrument having at least a first and a second sensor for measuring a physical quantity wherein each such sensor measures the same physical quantity;
a central processing unit (CPU) connected to the well-logging instrument via a telemetry system cable and a storage system connected to the central processing unit and having:
a depth correction logic operable to instruct the CPU to compute a corrected depth from sensor readings of the first and second sensors measuring the same physical quantity.

13. The well-logging data acquisition system of claim 12 wherein the physical quantity is pressure and the first and second sensors are pressure sensors.

14. The well-logging data acquisition system of claim 12 wherein the physical quantity is spontaneous potential and the first and second sensors are spontaneous potential sensors.

15. The well-logging data acquisition system of claim 12 wherein the first and second sensors are separated from one another by a known distance.

* * * * *